United States Patent
Terry (10) Patent No.: US 9,756,481 B2
(45) Date of Patent: **\*Sep. 5, 2017**

(54) METHOD AND WIRELESS TRANSMIT/RECEIVE UNIT (WTRU) FOR RECEIVING MULTIMEDIA BROADCAST/MULTICAST SERVICE

(71) Applicant: Intel Corporation, Santa Clara, CA (US)

(72) Inventor: Stephen E. Terry, Northport, NY (US)

(73) Assignee: INTEL CORPORATION, Santa Clara, CA (US)

( * ) Notice: Subject to any disclaimer, the term of this patent is extended or adjusted under 35 U.S.C. 154(b) by 92 days.

This patent is subject to a terminal disclaimer.

(21) Appl. No.: 14/667,571

(22) Filed: Mar. 24, 2015

(65) Prior Publication Data
US 2015/0201310 A1 Jul. 16, 2015

Related U.S. Application Data

(63) Continuation of application No. 13/789,452, filed on Mar. 7, 2013, now Pat. No. 9,014,710, which is a
(Continued)

(51) Int. Cl.
*H04W 4/06* (2009.01)
*H04L 12/18* (2006.01)
(Continued)

(52) U.S. Cl.
CPC ............. *H04W 4/06* (2013.01); *H04L 12/189* (2013.01); *H04W 72/005* (2013.01);
(Continued)

(58) Field of Classification Search
None
See application file for complete search history.

(56) References Cited

U.S. PATENT DOCUMENTS 5,327,576 A 7/1994 Uddenfeldt et al.
5,475,861 A 12/1995 Hall
(Continued)

FOREIGN PATENT DOCUMENTS

CN 1129054 8/1996
CN 1340932 A 3/2002
(Continued)

OTHER PUBLICATIONS

3GPP TS 22.146 V6.0.0, Technical Specification Group Services and System Aspects; Multimedia Broadcast/Multicast Service; Stage 1 (Release 6) Jul. 4, 2002, Chapter 4, 4.1, 4.2. 5.3.
(Continued)

*Primary Examiner* — Christopher Crutchfield
*Assistant Examiner* — Alan Lindenbaum
(74) *Attorney, Agent, or Firm* — Blakely Sokoloff Taylor and Zafman LLP (57) ABSTRACT

A method and wireless transmit/receive unit (WTRU) for receiving a multimedia broadcast/multicast service (MBMS) data is disclosed. A WTRU receives MBMS data segments from a first MBMS transmitting source along with segmentation information. The WTRU receives MBMS data segments and segmentation information from a second MBMS transmitting source. The MBMS data segments from the first MBMS transmitting source and the MBMS data segments from the second MBMS transmitting source are received in different order. The WTRU reassembles the MBMS data segments based on the segmentation information received from the first MBMS transmitting source and the second MBMS transmitting source.

22 Claims, 3 Drawing Sheets

Related U.S. Application Data continuation of application No. 13/187,812, filed on Jul. 21, 2011, now Pat. No. 8,417,245, which is a continuation of application No. 11/784,392, filed on Apr. 6, 2007, now Pat. No. 7,986,950, which is a continuation of application No. 10/637,022, filed on Aug. 7, 2003, now Pat. No. 7,212,824.

(60) Provisional application No. 60/402,161, filed on Aug. 7, 2002.

(51) Int. Cl.
  H04W 72/00 (2009.01)
  H04W 88/18 (2009.01)
  H04W 72/04 (2009.01)
  H04W 72/12 (2009.01)

(52) U.S. Cl.
  CPC ....... *H04W 72/0406* (2013.01); *H04W 88/18* (2013.01); *H04W 72/048* (2013.01); *H04W 72/1263* (2013.01)

(56) References Cited

U.S. PATENT DOCUMENTS

| | | | |
|---|---|---|---|
| 5,592,471 A | 1/1997 | Briskman | |
| 5,754,541 A | 5/1998 | Glisic et al. | |
| 5,920,817 A | 7/1999 | Umeda et al. | |
| 6,349,210 B1 | 2/2002 | Li | |
| 6,374,112 B1 | 4/2002 | Widegren et al. | |
| 6,418,138 B1 | 7/2002 | Cerf et al. | |
| 6,477,206 B1 | 11/2002 | Chatani | |
| 6,567,375 B2 | 5/2003 | Balachandran et al. | |
| 6,577,348 B1 | 6/2003 | Park | |
| 6,633,753 B1 | 10/2003 | Kido | |
| 6,760,303 B1 | 7/2004 | Brouwer | |
| 6,795,419 B2 | 9/2004 | Parantainen et al. | |
| 6,819,930 B1 | 11/2004 | Laroia et al. | |
| 6,850,540 B1 | 2/2005 | Peisa | |
| 6,850,982 B1 | 2/2005 | Siegel | |
| 7,177,658 B2 | 2/2007 | Willenegger et al. | |
| 7,239,880 B2 | 7/2007 | Shaheen | |
| 7,362,715 B2 | 4/2008 | Ohtani et al. | |
| 7,583,977 B2 | 9/2009 | Willenegger et al. | |
| 2002/0018450 A1 | 2/2002 | McKenna et al. | |
| 2002/0057663 A1 | 5/2002 | Lim | |
| 2002/0065035 A1 | 5/2002 | Koshino | |
| 2002/0075817 A1 | 6/2002 | Uebayashi et al. | |
| 2002/0085516 A1 | 7/2002 | Bridgelall | |
| 2002/0094833 A1 | 7/2002 | Van Lieshout et al. | |
| 2002/0177468 A1* | 11/2002 | Takeuchi ............. | H04W 16/28 455/562.1 |
| 2003/0012217 A1 | 1/2003 | Andersson et al. | |
| 2003/0033253 A1 | 2/2003 | Rhodes | |
| 2003/0054807 A1 | 3/2003 | Hsu et al. | |
| 2003/0073453 A1 | 4/2003 | Basilier | |
| 2003/0096619 A1 | 5/2003 | Winberg | |
| 2003/0207696 A1* | 11/2003 | Willenegger ......... | H04W 52/40 455/522 |
| 2003/0223394 A1 | 12/2003 | Parantainen et al. | |
| 2004/0014482 A1 | 1/2004 | Kwak et al. | |
| 2004/0081192 A1 | 4/2004 | Koulakiotis et al. | |
| 2004/0087320 A1 | 5/2004 | Kim et al. | |
| 2004/0131075 A1 | 7/2004 | Sinnarajah et al. | |
| 2005/0085182 A1 | 4/2005 | Chuberre et al. | |
| 2007/0082606 A1 | 4/2007 | Eckert et al. | |
| 2007/0220573 A1 | 9/2007 | Chiussi et al. | |
| 2010/0172279 A1 | 7/2010 | Chen et al. | |

FOREIGN PATENT DOCUMENTS

| | | |
|---|---|---|
| EP | 1 059 823 | 12/2000 |
| GB | 2 369 268 | 5/2002 |
| JP | 7-87011 | 3/1995 |
| JP | 11-041186 | 2/1999 |
| JP | 2000-138966 | 5/2000 |
| JP | 2002-165262 | 6/2002 |
| JP | 2002-259807 | 9/2002 |
| JP | 2003-069491 | 3/2003 |
| JP | 4982549 | 7/2012 |
| KR | 100248425 | 12/1999 |
| KR | 2001-42426 | 5/2001 |
| KR | 2002025132 A | 4/2002 |
| RU | 2257674 | 7/2005 |
| RU | 2258311 | 8/2005 |
| RU | 2004/116920 | 9/2005 |
| RU | 2262196 | 10/2005 |
| RU | 2262811 | 10/2005 |
| TW | 412686 | 11/2000 |
| WO | 99/52307 | 10/1999 |
| WO | 00/35226 | 6/2000 |
| WO | WO-0062547 | 10/2000 |
| WO | 00/74416 | 12/2000 |
| WO | WO-01/30103 | 4/2001 |
| WO | WO-01/31950 | 5/2001 |
| WO | WO-0131950 | 5/2001 |
| WO | 01/65817 | 9/2001 |
| WO | 01/76304 | 10/2001 |
| WO | 01/99461 | 12/2001 |
| WO | 02/15607 | 2/2002 |
| WO | 02/32178 | 4/2002 |
| WO | 02/45288 | 6/2002 |
| WO | 02/087267 | 10/2002 |
| WO | 03/030451 | 4/2003 |
| WO | 2004/028042 | 4/2004 |

OTHER PUBLICATIONS

Notice of Allowance mailed Dec. 31, 2014, in U.S. Appl. No. 13/789,452, 7 pages.
Office Action dated Aug. 5, 2015 (+ English translation), in Taiwan Patent Application No. 103144066, 17 pages.
Office Action mailed Sep. 5, 2014, in U.S. Appl. No. 13/789,452, 6 pages.
3GPP TR 23.346 V1.1.1; Technical Specification Group Services and System Aspects; Multimedia Broadcast/Multicast Service; Architecture and Functional Description (Release 6); Third Generation Partnership Project (Jan. 2002).
3GPP TS 25.346 V2.0.0; Technical Specifcation Group Radio Access Network; Introduction of the Multimedia Broadcast Multicast Service (MBMS) in the Radio Access Network (Stage-2) (Release 6); 3$^{rd}$ Generation Partnership Project (Jun. 2003).
3GPP TS 25.cde v0.0.1; Technical Specification Group Radio Access Network; Introduction of the Multimedia Broadcast Multicast Service (MBMS) in RAN; (Release 6); 3$^{rd}$ Generation Partnership Project (May 2002).
Presentation of Specification to TSG or WG, TS 25.345, Version 2.0.0, RP-030309, TSG-RAN meeting #20, Hämeenlinna, Finland, (Jun. 3-6, 2003).
Siemens, "UTRAN Functions to Support MBMS," TSG-RAN Working Group 2 Meeting #30, R2-021682, pp. 1-3 (Jun. 24, 2002).
Universal Mobile Telecommunications System (UMTS); Multimedia Broadcast/Multicast Service (MBMS); Stage 1 (3GPP TS 22.146 version 5.2.0 Release 5), ETSI TS 122 145 V5.2.0 (Mar. 2002).
First Office Action for Taiwan Application No. 099105086 dated Aug. 20, 2013, 13 pages.
Siemens, "Support of UEs in CELL-DCH with Limited Capabilities," 3GPP TSG-RAN Working Group 2 Meeting on MBMS, R2-030897, Paris, France, May 15-16, 2003.
Lucent Technologies, "Comparison of DSCH and FACH for MBMS," 3GPP TSG RAN2 WG#33 meeting, R3-023017, Nov. 12-15, 2002.
Qualcomm Europe, "Autonomous Soft Handover for MBMS," 3GPP TSG-RAN2 Meeting #32 R02-022618, Xian, China, Sep. 23-27, 2002.
Communication pursuant to Article 94(3) EPC dated Jul. 19, 2013, in European Patent Application No. 03 784 933.8, 3 pages.

(56) References Cited

OTHER PUBLICATIONS

Decision of Rejection dated Nov. 29, 2013 (+ English translation), in Taiwan Patent Application No. 099105086, 6 pages.
Examiner's Report dated Oct. 16, 2014, in Canadian Patent Application No. 2,783,633, 5 pages.
Notice of Allowance for U.S. Appl. No. 13/187,812, Dec. 7, 2012.
Office Action and Search Report for Taiwan Patent Application No. 100120265, mailed Jun. 24, 2014, 8 pages.
Office Action for Norwegian Patent Application No. 20051027 mailed May 24, 2014 (+ English translation), 8 pages.
Notice to Grant Taiwanese Application No. 103144066, mailed on Apr. 19, 2016, 2 pages.
Examination Report received for European Application No. 03784933.8, mailed May 2, 2016, 5 pages.
Official Action (+ English Translation) in Norwegian Patent Application No. 20051027, mailed Mar. 30, 2016, 3 pages.
Search Report for European Application No. 12193703.1, mailed Jun. 13, 2016, 10 pages.
3GPP TS 25.304, "Technical Specification Group Radio Access Network; UE Procedures in Idle Mode and Procedures for Cell Reselection in Connected Mode." V5.1.0 (Release 5), Jun. 2002, (Jun. 2002).
3GPP TR 23.846, "Technical Specification Group Services and System Aspects; Multimedia Broadcast/Multicast Service; Architecture and Functional Description," vol. 1.0.1 (Release 6), Jan. 2002.
Notice to Grant in Norwegian Application No. 20051027 mailed on Nov. 16, 2016, 2 pgs.
Notice of Allowance in Taiwanese Application No. 099105086, mailed Jun. 10, 2014, 2 pgs.
Notice of Allowance for Taiwanese Application No. 100120265 mailed Nov. 18, 2014, 2 pgs.
Office Action for European Application No. 03784933.8 mailed Jul. 27, 2010, 4 pgs.
Notice of Allowance for Canadian Application No. 2,666,198 mailed Jan. 10, 2012, 1 page.
Office Action for India Application No. 1250/DELNP/2007 mailed Feb. 13, 2013, 1 page.
Notice of Allowance in Korean Application No. 10-2005-7018512 mailed Sep. 25, 2012, 3 pgs.
Office Action in Korean Application No. 10-2005-7018512 mailed Oct. 18, 2011, 2 pgs.
Notice of Allowance in Korean Application No. 10-2010-7026277 mailed May 23, 2012, 3 pgs.
Office Action (+English Translation) for Korean Application No. 10-2012-7009420 mailed Jul. 7, 2012, 6 pgs.
Notice of Allowance (+English Translation) in Korean Application No. 10-2012- 7009420 mailed Jun. 25, 2013, 3 pgs.
English Translation of Final Office Action for Korean Application No. 10-2012-7009420 mailed Nov. 19, 2012, 2 pgs.
English Translation of Preliminary Rejection for Korean Application No. 10-2012- 7022223 mailed Nov. 19, 2012, 2 pgs.
Notice of Allowance (+English Translation) for Korean Application No. 10-2012-7022223 mailed Jun. 25, 2013, 3 pgs.
English Translation of First Office Action in Chinese Application No. 200910005367.1 mailed Apr. 13, 2010, 11 pgs.
English Translation for a Second Office Action in Chinese Application No. 2009100005367.1 mailed Nov. 24, 2010, 11 pgs.
English Translation on a Third Office Action for Chinese Application No. 200910005367.1 mailed May 25, 2011, 6 pgs.
English Translation of a Forth Office Action in Chinese Application No. 200910005367.1 mailed Feb. 21, 2012, 5 pgs.
Notice of Allowance (+English Translation) in Chinese Application No. 20091005367.1 mailed Oct. 12, 2012, 4 pgs.
Office Action in Japanese Application No. 2011-123288 mailed Mar. 26, 2013, 2 pgs.
Decision to Grant in Japanese Application No. 2011-123288 mailed Jun. 18, 2013. 3 pgs.
Non-Final Office Action for U.S. Appl. No. 10/637,022 mailed Nov. 1, 2005, 7 pgs.
Notice of Allowance for U.S. Appl. No. 10/637,022 mailed Nov. 30, 2006, 5 pgs.
Notice of Allowance in U.S. Appl. No. 11/784,392 mailed Mar. 18, 2011, 6 pgs.
Final Office Action for U.S. Appl. No. 11/784,392 mailed Jul. 9, 2010, 7 pgs.
Non-Final Office Action for U.S. Appl. No. 11/784,392 mailed Nov. 18, 2009, 8 pgs.
Second Non-Final Office Action for U.S. Appl. No. 13/187,812 mailed Jul. 10, 2012, 7 pgs.
Intent to Grant in European Application No. 03784933.8 mailed Jan. 2, 2017, 5 pgs.
Notice of Allowance in U.S. Appl. No. 11/450,700 mailed Dec. 8, 2006, 2 pgs.
First Office Action in U.S. Appl. No. 13/187,812 mailed Jan. 19, 2012, 6 pgs.
Notice of Allowance in Canadian Application No. 2,783,633 mailed Sep. 25, 2015, 1 page.
Office Action in U.S. Appl. No. 13/789,452 mailed Sep. 5, 2014, 6 pgs.
Notice of Allowance in U.S. Appl. No. 13/789,452 mailed Dec. 31, 2014, 7 pgs.
Notice of Allowance for U.S. Appl. No. 13/187,812 mailed Oct. 7, 2012, 6 pgs.
Office Action (+English Translation) for Norwegian Application No. 20051027 mailed May 24, 2014, 8 pgs.
Office Action and Search Report (+English Translation) in Taiwan Application No. 099105086 mailed Aug. 20, 2013, 7 pgs.
Office Action and Search Report for Taiwan Application No. 100120265 mailed Jun. 24, 2014, 10 pgs.
3GPP TS 25.346 V6.9.1; Technical Specification Group Radio Access Network; Introduction of the Multimedia Broadcast Multicast Service (MBMS) in the Radio Access Network (Stage 2) (Release 6); 3rd Generation Partnership Project (Sep. 2006).

\* cited by examiner

METHOD AND WIRELESS TRANSMIT/RECEIVE UNIT (WTRU) FOR RECEIVING MULTIMEDIA BROADCAST/MULTICAST SERVICE

CROSS REFERENCE TO RELATED APPLICATIONS

This application is a continuation of U.S. patent application Ser. No. 13/789,452, filed Mar. 7, 2013; which is a continuation of U.S. patent application Ser. No. 13/187,812, filed Jul. 21, 2011, now U.S. Pat. No. 8,417,245, issued Apr. 9, 2013; which is a continuation of U.S. patent application Ser. No. 11/784,392, filed Apr. 6, 2007, now U.S. Pat. No. 7,986,950, issued Jul. 26, 2011; which is a continuation of U.S. patent application Ser. No. 10/637,022, filed Aug. 7, 2003, now U.S. Pat. No. 7,212,824, issued May 1, 2007; which claims the benefit of priority from U.S. Provisional Patent Application No. 60/402,161, filed Aug. 7, 2002, all of which applications are incorporated herein by reference in their entireties.

FIELD OF INVENTION

The present invention generally relates to wireless communication systems. In particular, the present invention relates to channel switching and scheduling of multimedia broadcasts and multicast services in such systems.

BACKGROUND

There is a growing desire to use multimedia broadcasts/multicast services (MBMS) in wireless communication systems. For a particular MBMS, a given cell in the network may have none, one, or multiple users, wireless transmit/receive units (WTRUs), subscribed to that MBMS. As users migrate between cells, a cell that may originally have one or no users subscribed to the service may at a later point have multiple subscribed users. Conversely, a cell that may at one point have multiple subscribed users may at another time have only one or no users.

This migration of the users can create inefficient use of radio resource. If only one or a few users are subscribed to the MBMS in the cell, it may be desirable to support the service using dedicated channels to the users. The dedicated channels can utilize power control and beam steering to reduce the amount of radio resources utilized to support the MBMS.

However, if many users are subscribed to the MBMS in the cell, the multiple dedicated channels in total may use considerable radio resources. In such a situation, a more optimal use of the radio resources may be to send the MBMS data over a common/shared channel to a set of users subscribed to that MBMS. Although the use of beamsteering and power control in such situations is limited, the reduction in the number of total channels may reduce the used radio resources. As the number of MBMS users in the cell changes, an original choice of using either a common/shared channel or a dedicated channel may not be optimal at a later time.

Another potential problem resulting from user migration is MBMS scheduling. As an MBMS user moves between cells, that user needs to reconstruct the MBMS service from information received from both cells. If both cells synchronize their MBMS transmissions, the MBMS user can seamlessly move between the cells.

However, such a scenario is typically not practical and undesirable. At certain time intervals based on the cell's loading and available resources, a cell may have more available resources to support the MBMS transmission than at another time. As a result, at that time, it is desirable for that cell to transmit a large amount of the MBMS data. For another cell at that same time interval, resources to support the same MBMS bandwidth may not be available. As a result, it may be desirable to schedule the MBMS transmissions differently between the cells, to better utilize such resources. As the MBMS user moves between cells, the new cell that the user has moved into may have transmissions either ahead or behind the other cell's transmissions. As a result, the MBMS user may miss MBMS data or needlessly receive redundant MBMS data.

Accordingly, it is desirable to have better resource utilization for MBMS.

SUMMARY

A method and wireless transmit/receive unit (WTRU) for receiving a multimedia broadcast/multicast service (MBMS) data is disclosed. A WTRU receives MBMS data segments from a first MBMS transmitting source along with segmentation information. The WTRU receives MBMS data segments and segmentation information from a second MBMS transmitting source. The MBMS data segments from the first MBMS transmitting source and the MBMS data segments from the second MBMS transmitting source are received in different order. The WTRU reassembles the MBMS data segments based on the segmentation information received from the first MBMS transmitting source and the second MBMS transmitting source.

DETAILED DESCRIPTION OF THE PREFERRED EMBODIMENT(S)

Although the preferred embodiments are described in conjunction with a third generation partnership program (3GPP) wideband code division multiple access (W-CDMA) system, the embodiments are applicable to any wireless system using MBMS. Hereafter, a wireless transmit/receive unit (WTRU) includes but is not limited to a user equipment, mobile station, fixed or mobile subscriber unit, pager, or any other type of device capable of operating in a wireless environment.

Figure 1:
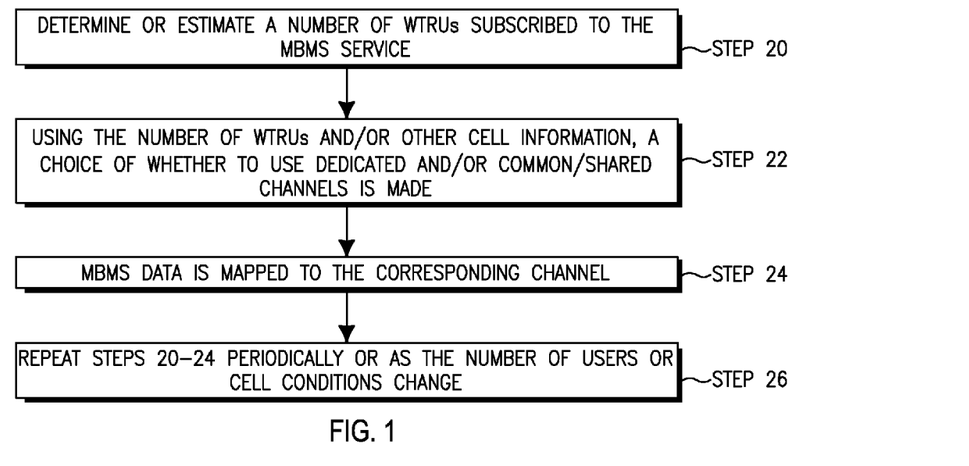
FIG. 1 is a flow chart for use in MBMS channel switching.

FIG. 1 is a flow chart for channel switching for an MBMS. In a particular cell, the number of WTRUs subscribed to the service is determined or estimated, step 20. Typically, this information is known. Using the number of WTRUs in the cell and/or other cell information, such as information on cell conditions, available cell resources, etc., a choice of whether dedicated channels, a common/shared channel, or both are used, step 22. After the channel choice is made, the MBMS data is mapped to the corresponding channel(s), step 24. One possible approach to determine which type(s) of channels should be used is a threshold test. If below a certain threshold number of WTRUs are in the cell, dedicated channels are used. The dedicated channels allow for power control and transmit diversity techniques to be employed. These techniques are highly desirable when high data rate MBMS transfers are made, to efficiently use the available resources.

If the number of WTRUs exceed the threshold, a common/shared channel is used, such as a shared channel, a high speed shared channel, or a secondary common control physical channel (S-CCPCR). A shared channel or high speed shared channel can be used to transfer the MBMS data to multiple WTRUs simultaneously. The SCCPCR can be used to broadcast the MBMS data to multiple users. Typically, the shared/common channels are less radio resource efficient.

In an alternate embodiment, a two threshold scheme may be used. If the number of MBMS subscribed WTRUs in the cell are below a first threshold, dedicated channels are used. If the number is between a first and second threshold, a shared or high speed shared channel is used. If the number exceeds the second threshold, a common channel is used to broadcast the MBMS.

Under certain circumstances, it may be desirable to use both shared and dedicated channels to support an MBMS. To illustrate, many subscribing WRTU s may be located together, such as at a train station, and a few or a single WTRU may be outside of the train station. In such a situation, the most efficient use of cell resources to support the MBMS may be to allocate a shared channel to the train station WTRU s and a dedicated channel to the other WTRU. As the number of users in a cell changes, the cell conditions change or periodically, the channel choice is repeated using the new information, step 26.

Figure 2:
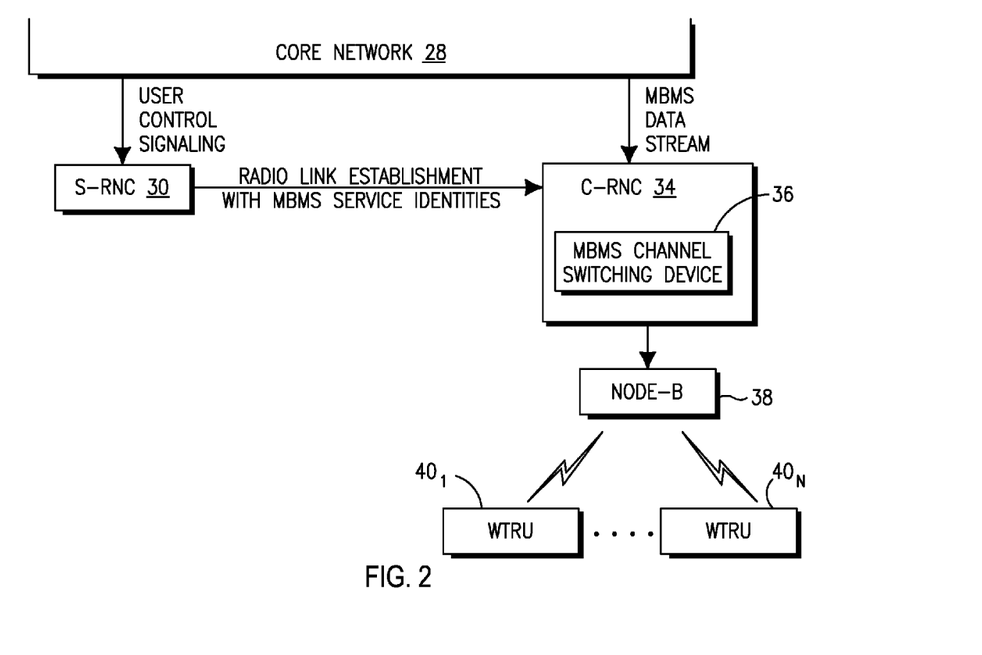
FIG. 2 is a radio access network using MBMS channel switching.

FIG. 2 is an illustration of a preferred radio access network (RAN) for performing channel switching. The RAN is managed by a serving radio network controller (S-RNC) 30 which manages the user's services and the controlling radio network controller (C-RNC) 34 which manages the physical resources of the cells. Signaling procedures which provide the coordination needed between the S-RNCs 30 and the C-RNCs 34 for proper operation of the RAN are utilized.

A channel switching entity (MBMS channel switching device 36) determines which channels to use, such as dedicated, shared or the common, for MBMS transmission and it also coordinates reception of the MBMS with the WTRUs 401 to 40N (40). The MBMS data is sent to the WTRUs 40 via the Node-B 38.

A preferred implementation of the channel switching is as follows. A first WTRU 40 subscribed to the MBMS can enter and exit cells autonomously with respect to the activation and distribution of the MBMS service. When the MBMS is first established for the first WTRU 40 or a small number of users within a particular cell, dedicated channels are established with a unique radio link (RL) indicator that identifies the MBMS service. A second WTRU 40 that wishes to utilize another MBMS will have a different dedicated channel assigned to that user. When the RL is established for each user, a unique MBMS indicator is signaled from the S-RNC 30 to the C-RNC 34. This MBMS indicator is unique to each service provided to the user. The C-RNC 34 maintains a database of all users currently active for a particular MBMS service and this group is known as the MBMS user group.

The data for each active MBMS service is distributed to the C-RNC 34 from the core network 28 via the MBMS data stream. A unique identifier is associated with each MBMS data stream allowing the C-RNC 34 to associate the data with the appropriate user or user group so the data can be properly routed. Depending on the number of active users for a particular MBMS service and cell conditions, the C-RNC 34 will determine if the service should be transmitted on dedicated or shared/common channels.

Since individual users autonomously enter and exit the cell, the switching between dedicated and common channels is dynamic and may occur during ongoing transmissions. Dynamic switching can be applied to the downlink shared channels (DSCH). Data can be sent on the DSCH to be received by a single user and is referred to as dedicated DSCH (D-DSCH) or by multiple users simultaneously and is referred to as common DSCH (C-DSCH). For a particular MBMS when there is only one user or a small number of users existing within the cell, the DSCH will be a D-DSCH to the user or users. When the number of users associated with a particular MBMS increases, a C-DSCH can be established for this MBMS user group.

When the first WTRU 40 becomes active within the cell, a D-DSCH is established to this first user. The MBMS transmission may not necessarily be continuously active. The transmission of the MBMS on the DSCH is indicated to the first WTRU 40 on an associated dedicated channel. This indication may be turned on and off on a transmission time interval (TTI) basis.

The C-DSCH may be physically identical to the D-DSCH. However, a distinguishing characteristic is that the signaling for the DSCH transmission for the individual user associated with a dedicated channel within the MBMS user group is that the transmission is synchronized. This allows all users in the MBMS user group to receive the common DSCH transmission. An indication may be signaled along with MBMS transmissions to indicate that the MBMS transmission is either dedicated to a particular user or common to the users in the MBMS user group. This allows for proper operation of power control techniques, transmit diversity, or any other unique physical transmission attributes. The MBMS transitions between dedicated and common DSCH is preferably transparent to the WTRU 40.

In another embodiment, the channel switching is applied to the high speed DSCH (HS-DSCH). A difference between using the HS-DSCH instead of the DSCH is that rather than applying synchronized allocations in the C-RNC 34 on the associated dedicated channels, the synchronized allocations are provided on HS-DSCH control channels in Node-B 38.

In another embodiment, switching may be performed between the dedicated physical channels and common physical channels without the use of the associated dedicated channels. The channel switching between the dedicated channels to the common channels is explicitly signaled to each user. The RAN layer 3 protocols allow for procedures of signaling the radio frame to transition between the dedicated and the common channels. The signaling is performed by either signaling a radio frame for the transition or by signaling the transmission scheduling information.

Figure 3:
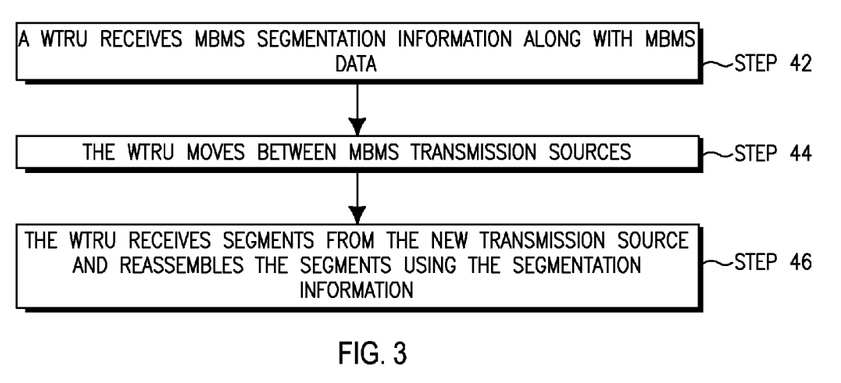
FIG. 3 is a flow chart for coordinating reception of an MBMS transmission from multiple sources using in band segmentation information.
Figure 4:
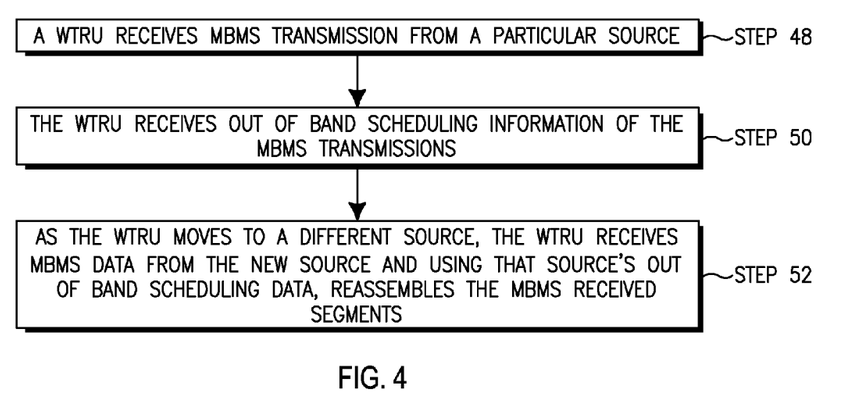
FIG. 4 is a flow chart for coordinating reception of an MBMS transmission from multiple sources using out of band segmentation information.

FIGS. 3 and 4 are flow charts to allow for different cells and different inter-cell MBMS transmissions to be scheduled in different orders. To illustrate, a first cell may be able to transmit large amounts of MBMS data to WTRUs 40 in a radio frame that a second cell can not. As a result, MBMS transmission in the first cell may be one or multiple radio frames or TTIs ahead of the second cell.

To illustrate for inter-cell, within a cell, one group of users may be located in a train station and serviced by a common DSCH and another user within the same cell may be outside of the train station and be serviced by a dedicated channel or dedicated DSCH to take full advantage of beam forming and power control. Based on the DSCH loading and other factors, it may be desirable for transmissions to the train station WTRUs 40 to either lead or lag the outside WTRU transmissions. If a user of the outside WTRU 40 goes to the train station, it would most likely be desirable to switch that WTRU 40 to the common DSCH and disestablish the dedicated channel. In this scenario, the outside WTRU 40 may need to catch up to the transmissions on the common DSCH or allow those transmissions to catch up to the segments that the WTRU 40 already received.

To maintain continuous service distribution and make more efficient use of radio resources, the MBMS transmissions are preferably either segmented or scheduled so that users can receive elements of an MBMS service transmission in any order. As a result, the MBMS service transmissions do not have to be reinitiated in a cell upon a user entry to that cell or the user does not have to wait to synchronize with an existing MBMS service transmission.

FIG. 3 is a flow chart for using in-band segmentation information to handle differing MBMS transmission orders either inter-cell or between cells. Along with the MBMS transmissions, segmentation information is sent along with the MBMS data, step 42. This segmentation information typically includes a segment identifier so that each receiving WTRU is aware of which segments that it has received. As a particular WTRU moves between MBMS transmission sources (between cells or switched channels), step 44, the WTRU can receive segments from the new MBMS source and reassemble the transmissions to recover all the MBMS data, step 46.

Figure 5:
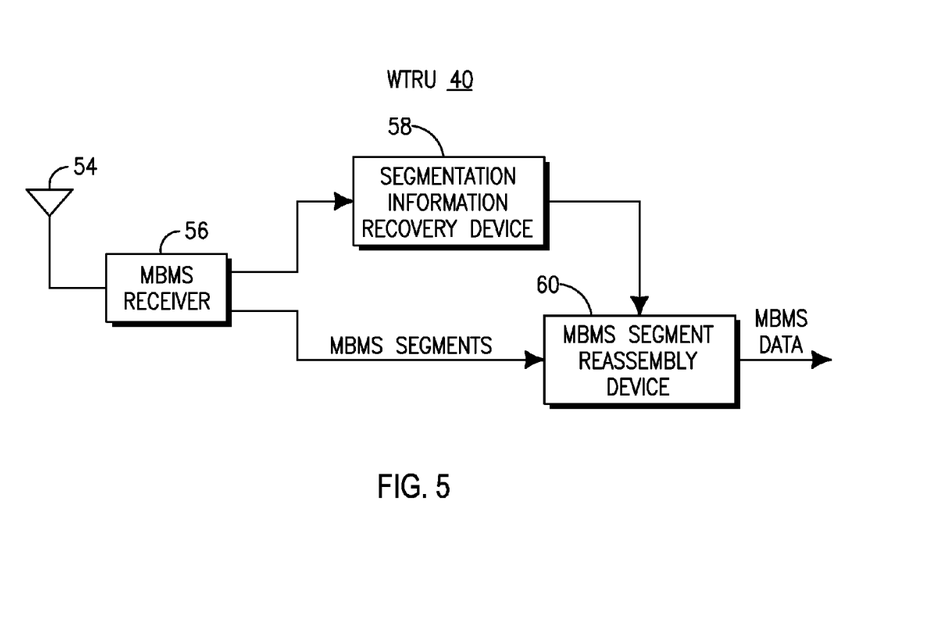
FIG. 5 is a WTRU for receiving MBMS information using in band segmentation information.

FIG. 5 is a simplified block diagram of a WTRU 40 for receiving the differing MBMS transmissions. The WTRU 40 receives the MBMS transmissions using an antenna 54. An MBMS receiver 56 receives the MBMS transmissions from the differing transmission sources, including the in band segmentation information. A segmentation information recovery device 58 recovers the segmentation information. Using the segmentation information and received MBMS segments, an MBMS segmentation reassembly device 60 reassembles the segments to recover the MBMS data.

FIG. 4 is a flow chart for using out of band transmission scheduling information to handle differing MBMS transmission orders. A WTRU receives an MBMS transmission from a particular source, step 48. The WTRU also receives out of band scheduling information, step 50. As the WTRU moves to a different source, the WTRU can receive MBMS data from the new source and using that source's out of band scheduling data reassemble the MBMS received segments, step 52.

Figure 6:
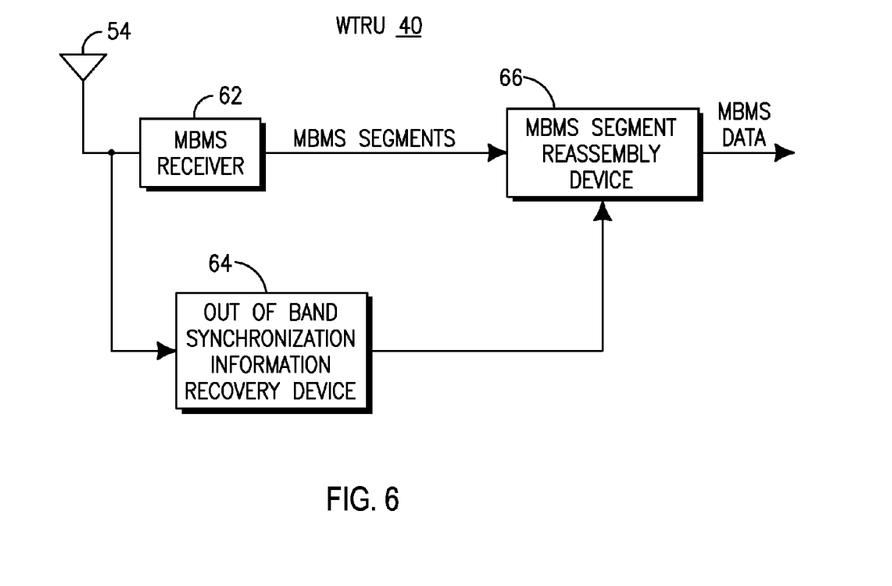
FIG. 6 is a WTRU for receiving MBMS information using out of band synchronization information.

FIG. 6 is a simplified block diagram of a WTRU 40 for receiving the differing MBMS transmissions. The WTRU 40 receives the MBMS transmissions using an antenna 54. An MBMS receiver 62 receives the MBMS transmissions from the differing transmission sources. An out of band synchronization information device 64 receives synchronization information from the multiple transmission sources. Using the synchronization information and received MBMS segments, an MBMS segmentation reassembly device 66 reassembles the segments to recover the MBMS data.

Both the approaches of FIGS. 3 and 4 allow for users existing within the cell to just transition between dedicated and common channels without interruption or delay in the MBMS transmission. Additionally, WTRU s entering the cell can maintain continuous reception of the MBMS service, even though the sequence of transmission between the new and old cell are different. Once MBMS transmission data is received, the WTRU reorders the information according to the in band segmentation and/or out of band transmission scheduling information.

Since either in band segmentation or out of band scheduling is provided, lost or failed transmissions can be efficiently recovered by the WTRU's knowledge of when retransmission is expected. The RNC MBMS retransmission scheduling can also be reduced by taking into account intelligent reception by the WTRU s. To illustrate, if the RNC knows all the users have received a particular MBMS segment, retransmission of that segment can be prevented.

What is claimed is:

1. A wireless transmit/receive unit (WTRU) for receiving a multimedia broadcast/multicast service (MBMS) data, the WTRU comprising:

an antenna for transmission or reception of MBMS signals;

an MBMS receiver to:

receive data of an MBMS service from a first source over a first channel comprising one of a secondary common control physical channel (S-CCPCH) or a dedicated channel, and receive out of band scheduling information for the data received from the first source, the scheduling information being out of band with the first channel, and after the reception of the data of the MBMS service over the first channel, receive data of the MBMS service from a second source over a second channel in response to a movement of the WTRU, and receive out of band scheduling information for the data received from the second source, the scheduling information being out of band with the second channel, the second channel comprising a channel type different than the first channel and comprising the other of the dedicated channel or the S-CCPCH; and an MBMS reassembly device to reassemble the received MBMS data from both the first channel and the second channel based, at least in part, on the received out of band transmission scheduling information for the data received from the second source.

2. The WTRU of claim 1, wherein the WTRU is configured to switch the receiving of the data over the S-CCPCH to the dedicated channel in further response to a signal indicating the switch.

3. The WTRU of claim 2, wherein the WTRU is configured to perform the switch at an indicated radio frame.

4. The WTRU of claim 3, wherein:

the MBMS receiver is to receive the MBMS data over the first channel and the second channel from a plurality of unsynchronized cells.

5. The WTRU of claim 2, wherein the signal indicates the out of band transmission scheduling information.

6. The WTRU of claim 1, wherein the first channel comprises the S-CCPCH and the second channel comprises the dedicated channel, and wherein:

the MBMS receiver is to receive a first wireless signal including the received data of the MBMS service over the first channel and a second wireless signal including the received data of the MBMS service over the second channel, the second signal being a beam formed signal.

7. The WTRU of claim 1, wherein the first channel comprises the dedicated channel and the second channel comprises the S-CCPCH, and the WTRU further comprising:
the MBMS receiver is to receive a first wireless signal including the received data of the MBMS service over the first channel and a second wireless signal including the received data of the MBMS service over the second channel, the first signal being a beam formed signal.

8. A wireless transmit/receive unit (WTRU) for receiving a multimedia broadcast/multicast service (MBMS) data, the WTRU comprising:
means for receiving data of an MBMS service from a first source over a first channel comprising one of a secondary common control physical channel (S-CCPCH) or a dedicated channel, and for receiving out of band scheduling information for the data received from the first source, the scheduling information being out of band with the first channel;
after the reception of the data of the MBMS service over the first channel, means for receiving data of the MBMS service from a second source over a second channel in response to a movement of the WTRU, and for receiving out of band scheduling information for the data received from the second source, the scheduling information being out of band with the second channel, the second channel comprising a channel type different than the first channel and comprising the other of the dedicated channel or the S-CCPCH; and
means for reassembling the received MBMS data from both the first channel and the second channel based, at least in part, on the received out of band transmission scheduling information for the data received from the second source.

9. The WTRU of claim 8, wherein the WTRU is configured to switch the receiving of the data over the S-CCPCH to the dedicated channel in further response to a signal indicating the switch.

10. The WTRU of claim 9, wherein the signal indicates the out of band transmission scheduling information.

11. The WTRU of claim 10, further comprising:
means for receiving the MBMS data from a plurality of unsynchronized cells.

12. The WTRU of claim 9, wherein the WTRU is configured to perform the switch at an indicated radio frame.

13. The WTRU of claim 8, wherein the first channel comprises the S-CCPCH and the second channel comprises the dedicated channel, and the WTRU further comprising:
means for receiving a first wireless signal including the received data of the MBMS service over first channel and a second wireless signal including the received data of the MBMS service over the second channel, the second signal being a beam formed signal.

14. The WTRU of claim 8, wherein the first channel comprises the dedicated channel and the second channel comprises the S-CCPCH, and the WTRU further comprising:
means for receiving a first wireless signal including the received data of the MBMS service over the first channel and a second wireless signal including the received data of the MBMS service over the second channel, the first signal being a beam formed signal.

15. A method for use by a wireless transmit/receive unit (WTRU) for receiving multimedia broadcast/multicast service (MBMS) data, the method comprising:
receiving data of an MBMS service from a first source over a first channel comprising one of a secondary common control physical channel (S-CCPCH) or a dedicated channel, and receiving out of band scheduling information for the data received from the first source, the scheduling information being out of band with the first channel;
after the reception of the data of the MBMS service over the first channel, receiving data of the MBMS service from a second source over a second channel in response to a movement of the WTRU, and receiving out of band scheduling information for the data received from the second source, the scheduling information being out of band with the second channel, the second channel comprising a channel type different than the first channel and comprising the other of the dedicated channel or the S-CCPCH: and
reassembling the received MBMS data from both the first channel and the second channel based, at least in part, on the received out of band transmission scheduling information for the data received from the second source.

16. The method of claim 15, further comprising switching the reception of the data over the S-CCPCH to the dedicated channel in further response to a signal indicating the switch.

17. The method of claim 16, wherein the signal indicates the out of band transmission scheduling information.

18. The method of claim 17, further comprising:
receiving the MBMS data from a plurality of unsynchronized cells.

19. The method of claim 16, wherein the switching is performed at an indicated radio frame.

20. The method of claim 15, wherein the first channel comprises the S-CCPCH and the second channel comprises the dedicated channel, and the method further comprising:
receiving a first wireless signal including the received data of the MBMS service over the first channel and a second wireless signal including the received data of the MBMS service over the second channel, the second signal being a beam formed signal.

21. The method of claim 15, wherein the first channel comprises the dedicated channel and the second channel comprises the S-CCPCH, and the method further comprising:
receiving a first wireless signal including the received data of the MBMS service over the first channel and a second wireless signal including the received data of the MBMS service over the second channel, the first signal being a beam formed signal.

22. A non-transitory computer-readable storage medium having stored thereon data representing sequences of instructions that, when executed by a processor, cause the processor to perform operations comprising:
receiving data of an MBMS service from a first source over a first channel comprising one of a secondary common control physical channel (S-CCPCH) or a dedicated channel, and receiving out of band scheduling information for the data received from the first source, the scheduling information being out of band with the first channel;
after the reception of the data of the MBMS service over the first channel, receiving data of the MBMS service from a second source over a second channel in response to a movement of the WTRU, and receiving out of band scheduling information for the data received from the second source, the scheduling information being out of band with the second channel, the second channel comprising a channel type different than the first channel and comprising the other of the dedicated channel or the S-CCPCH; and reassembling the received MBMS data from both the first channel and the second channel based, at least in part, on the received out of band transmission scheduling information for the data received from the second source.

* * * * *